United States Patent [19]

Dauerman et al.

[11] 4,261,962

[45] Apr. 14, 1981

[54] SODIUM SULFITE REGENERATION METHOD USING LIMESTONE SLURRY

[75] Inventors: Leonard Dauerman, Fort Lee; Krishna K. Rao, Paterson; Joseph C. Dabbs, Fort Lee; Brian Delaney, Rosedale, all of N.J.

[73] Assignee: The Foundation at New Jersey Institute of Technology, Newark, N.J.

[21] Appl. No.: 56,466

[22] Filed: Jul. 11, 1979

[51] Int. Cl.$^3$ .............................................. C01B 17/00
[52] U.S. Cl. ................................. 423/242; 423/512 A
[58] Field of Search .................... 423/242, 379, 512 A

[56] References Cited

U.S. PATENT DOCUMENTS

| | | | |
|---|---|---|---|
| 1,271,899 | 7/1918 | Howard | 423/519 X |
| 1,378,617 | 5/1921 | Richter | 423/519 |
| 3,989,796 | 11/1976 | Morita et al. | 423/242 A |

FOREIGN PATENT DOCUMENTS 2447751  6/1975  Fed. Rep. of Germany ...... 423/242 A 51-26904  8/1976  Japan .................................. 423/242 A

OTHER PUBLICATIONS

Perry J. H., *Chemical Engineer's Handbook;* Third Ed., McGraw.

*Primary Examiner*—Vertiz O. R.
*Assistant Examiner*—Gregory A. Heller
*Attorney, Agent, or Firm*—Howson and Howson

[57] ABSTRACT

In the Double Alkali flue gas desulfurization process wherein sodium bisulfite is produced in a scrubber from the reaction of sulfur dioxide laden flue gases with an aqueous solution of sodium sulfite, the sodium sulfite is regenerated from the sodium bisulfite by reacting the same with a limestone slurry in a bifurcated mixing nozzle having a pair of converging inlets communicating with a common outlet. The reactants are flowed into the inlets at flow rates sufficient to produce turbulence in their zone of confluence in the nozzle to initiate a reaction which, although incomplete in the nozzle, proceeds at a rapid rate to completion after the mixed reactants leave the nozzle.

14 Claims, 4 Drawing Figures

SODIUM SULFITE REGENERATION METHOD USING LIMESTONE SLURRY

CROSS REFERENCE TO RELATED APPLICATION

Reference is hereby made to U.S. Application Ser. No. 056,467 filed concurrently herewith for Method and Apparatus Using Lime Slurry for Regenerating Sodium Sulfite in Double Alkali Flue Gas Desulfurization Process by the same inventors and assigned to the same assignee as the present application.

FIELD OF THE INVENTION

The present invention relates to the so-called Double Alkali method of flue gas desulfurization. More particularly, the present invention relates to an improved method for regenerating sodium sulfite from sodium bisulfite by reacting a limestone slurry with the sodium bisulfite in a special mixing nozzle.

BACKGROUND OF THE INVENTION

The above-referenced U.S. application discloses a method and apparatus in which sodium bisulfite can be reacted substantially instantaneously with a slurry of lime by conflowing two streams of the reactants into a special mixing nozzle at rapid flow rates to create turbulance in the nozzle and thereby to effect thorough mixing of the reactants. The disclosed process provides the advantage of eliminating the need for residence times of the reactants in cascaded, stirred batch-mix reactors. Thus, the process enables the capital cost required in the regeneration phase of the Double Alkali flue gas desulfurization process to be reduced.

One of the disadvantages of the disclosed process is the need to utilize a lime slurry as a reactant for the sodium bisulfite. Because the lime reacts instantaneously with the sodium bisulfite in the nozzle, it is a highly desirable reactant. However, because of its cost, lime is undesirable as compared with other reactants, such as limestone.

OBJECTS OF THE INVENTION

With the foregoing in mind, a primary object of the present invention is to provide a novel process for regenerating sodium sulfite from sodium bisulfite by utilizing limestone as a reactant instead of lime.

It is another object of the present invention to provide an economical process for regenerating sodium bisulfite which results from the reaction of an aqueous sodium sulfite solution with sulfur-dioxide in a flue gas scrubber.

It is a further object of the present invention to provide an efficient process for regenerating sodium sulfite from sodium bisulfite in a minimum amount of time using relatively low-cost limestone in the regeneration process.

SUMMARY OF THE INVENTION

As a more specific object, the present invention provides a simple and efficient method of reacting limestone with sodium bisulfite to produce a solid by-product and a sodium sulfite solution which is recycled to a scrubber for removing sulfur dioxide from flue gases. The method comprises the steps of producing a stream of limestone slurry flowing at a rate in excess of a predetermined minimum rate of flow, producing a stream of sodium bisulfite flowing at a rate in predetermined mass relation with said limestone slurry, conflowing the two streams into a bifurcated mixing nozzle having a pair of inlets and a common outlet, and retaining the effluent from the nozzle in a tank for a relatively-short period of time before filtering the effluent to remove solids produced by the reaction of the limestone with the sodium bisulfite.

BRIEF DESCRIPTION OF DRAWINGS

The foregoing and other objects, features and advantages of the present invention should become apparent from the following description when taken in conjunction with the accompanying drawings, in which.

DESCRIPTION OF PREFERRED METHOD

Figure 1:
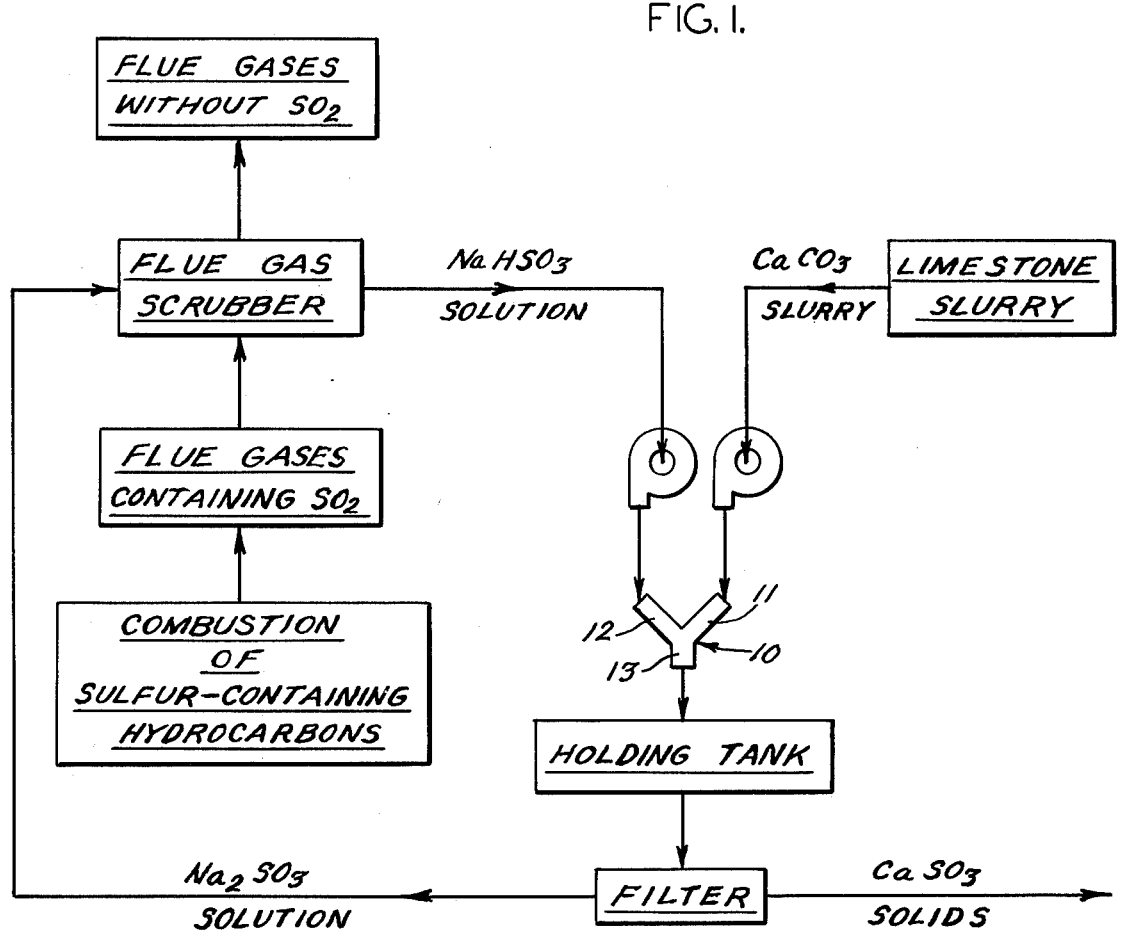
FIG. 1 illustrates schematically the method of the present invention used in the Double Alkali flue gas desulfurization process.

Referring now to the drawings, FIG. 1 illustrates schematically the Double Alkali flue gas desulfurization process in which the method of the present invention finds particular utility. As seen therein, an aqueous solution of sodium sulfite is admitted into a flue gas scrubber through which sulfur dioxide laden gases are flowed. In removing sulfur dioxide from the flue gases, the sulfur dioxide reacts with the sodium sulfite to produce sodium bisulfite.

As noted in the aforementioned related application, the sodium sulfite solution can be regenerated by reacting the sodium bisulfite with a lime slurry in a mixing nozzle such as disclosed in the application. The reaction takes place substantially instantaneously in the nozzle. Thus, the calcium sulfite precipitate resulting from the reaction can be filtered from the sodium sulfite solution substantially immediately after the reactants exit from the mixing nozzle. Although the aforementioned method functions satisfactorily, it is not completely satisfactory from an economic standpoint because lime is relatively expensive.

Limestone is a more desirable reactant because it is less expensive than lime. For instance, commercial grade lime having a suitable particle size for use in the process costs about $30.00 per ton. A corresponding grade of limestone, on the other hand, costs about $20.00 per ton. Considering the substantial tonnage required in the course of a day to remove sulfur dioxide from flue gas stacks, it should be apparent that considerable savings can be realized in using limestone as a reactant to regenerate sodium sulfite.

Figure 2:
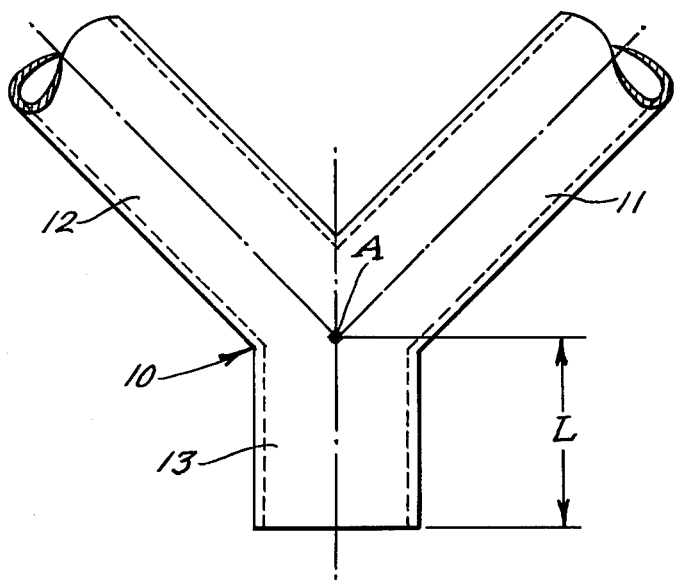
FIG. 2 illustrates a preferred form of nozzle for use in the method of the present invention.

It has been discovered than when a limestone slurry is conflowed with a sodium bisulfite solution in a mixing nozzle, such as illustrated in FIG. 2, the reaction does not go to completion in the nozzle as it does when lime is used as the reactant. Rather, only between 20 and 30 percent of the sodium bisulfite is converted to sodium sulfite immediately after exiting the nozzle, as contrasted with the 100 percent conversion which occurs within the nozzle when the reactant is lime. Conventional wisdom would expect that the 20–30 percent conversion would not significantly increase with time in an unstirred tank.

According to the present invention, it was discovered that, contrary to conventional wisdom, when the limestone slurry is conflowed with the sodium bisulfite in the mixing nozzle of FIG. 2 at predetermined flow rates, the reaction of limestone with sodium bisulfite was initiated in the nozzle at a predetermined rate of conversion and that the rate continued even after the reactants left the nozzle and were retained in an unstirred holding tank. Thus, it was discovered that the reaction went to completion in substantially the same amount of time that would have been expected had the reactants been separately flowed into the holding tank (or flowed through the nozzle at less than the required minimum velocities) and stirred in the holding tank for a period of time. Moreover, it has been found that when the nozzle-mixed effluent is agitated as by being stirred in the effluent holding tank, the time for complete conversion is significantly reduced.

In order to effect the reaction with minimum energy, the flow rates of the limestone slurry and sodium bisulfite into the inlets 11 and 12, respectively, are preferably maintained in the laminar flow regime at the inlets to the nozzle 10 at a point immediately upstream of the confluence of the inlets 11 and 12 located adjacent the apex A. To ensure adequate mixing, it has been discovered that the flow rate of the limestone slurry at the inlet 11 to the nozzle 10 must be greater than a predetermined minimum velocity which corresponds to the settling velocity $V_s$ of the limestone particles in the slurry. In other words, the slurry comprises limestone particles suspended in a water carrier. Depending on the size of the particles, and solids content of the slurry, the particles will settle out of the water carrier at different slurry flow velocities. As will be discussed, it has been found that when the limestone slurry flow rate is below the aforementioned minimum velocity $V_s$ inadequate mixing occurs in the nozzle 10, and all the advantages of the present invention are not realized. On the other hand, when the limestone slurry flow rate is above the minimum velocity $V_s$, where substantial settling of limestone particles does not occur at the nozzle inlet, satisfactory mixing occurs. Although the process will function at higher velocities in the turbulent flow regime, the power required to flow the streams at such velocities reduces the efficiency of the process and is, therefore, less desirable than when the flow rates are in the laminar flow regime.

The particle settling velocity depends on several variables such as the size of the particles and their solids content in the slurry. In brief, the higher the slurry velocity, the lower the percentage of particles that will settle. Although various engineering handbooks (such as *Perry's Chemical Engineering Handbook,* 3rd Ed.) are available from which settling velocity can be obtained based on particle size and solids content for relatively insoluble particles, it has been determined for purposes of the present invention that the settling velocity for a limestone slurry having particle sizes of about 200 mesh and a solids content of about 2.5 and 10%, on a weight basis, varies from about 0% at a flow rate in excess of 1 ft./sec. to about 100% at a flow rate of less than 0.1 ft./sec. As will be seen, as long as the limestone slurry flow rate into the nozzle 10 is at least about 0.5 ft./sec. (where less than 40% of the particles settle from the slurry), satisfactory flow mixing occurs in the nozzle 10 because the bifurcated mixing nozzle configuration overcomes partially this effect.

In order to demonstrate this phenomenon, a Y-shaped mixing nozzle 10 was fabricated having an inlet 11, a companion inlet 12 disposed at a dihedral angle of about 60 degrees relative to the inlet 11, and a common outlet 13 in fluid communication with the pair of inlets 11 and 12. The inside diameters of each inlet was 0.6 cm, and the cross-sectional area of the outlet 13 was at least as large as the combined cross-sectional areas of the inlets 11 and 12. The length L of the outlet measured from the intersection A of the inlet centerlines was about 2 diameters based on the inside diameter of the outlet.

The inlet 11 was connected to a source of limestone slurry, and the inlet 12 was connected to a source of sodium bisulfite. The molarity of the reactants was selected so that they were admitted to the nozzle 10 at the stoichiometric ratio (0.4 M sodium bisulfite: 0.2 M limestone). The solids content of the slurry was varied up to 4% and the average particle size was about 200 mesh. In running the test, approximately one liter of effluent from the nozzle 10 was collected in a beaker. It took approximately one minute to collect this quantity of effluent. The effluent was then allowed to stand unstirred. The effluent was periodically sampled, filtered and analyzed for calcium by the EDTA titration procedure and for sulfite by the Idometric titration procedure. From this analysis, from the mass balance based on the quantity of initial reactant and the reaction stoichiometry, the data set forth in Table I were calculated. It is noted that as long as the molar ratio of lime to sodium bisulfite is at least stoichiometric, or lime rich, there is a direct correlation between the percent conversion of calcium hydroxide to calcium sulfite and the conversion of sodium bisulfite to sodium sulfite. Because of certain analytical limitations, the conversion data set forth in Table I is the amount of calcium hydroxide which was analytically determined to have been converted to calcium sulfite divided by the amount of calcium hydroxide which theoretically could have been converted to calcium sulfite at the stated molar ratio.

TABLE I

Conversion of $CaCO_3$ to $CaSO_3$ as a Function of Time, the Concentration of the Reactants, and the Reactant Flow Rates

| Run No. | Reactant Concentration | | Reactant Flow Rates | | Percent Conversion/Time |
|---|---|---|---|---|---|
| | $NaHSO_3$ | $CaCO_3$ | cc/min. $NaHSO_3$ | (ft./sec.) $CaCO_3$ | |
| 1 | 0.4M | 0.2M | 311(.61) | 400(.88) | 100/24 hrs. |
| 2 | 0.4 | 0.2 | 390(.76) | 475(.92) | 99/24 hrs. |
| 3 | 0.4 | 0.2 | 100(.20) | 130(.28) | 3.5/24 hrs. |
| 4 | 0.2 | 0.4 | 300(.58) | 385(.75) | 100/4 mins. |
| 5 | 0.2 | 0.4 | 100(.20) | 130(.26) | 2/5 mins. |
| 6* | 0.4 | 0.2 | 410(.80) | 525(1.03) | 100/12 mins. |
| 7* | 0.4 | 0.2 | 410(.80) | 525(1.03) | 100/11 mins. |
| 8** | 0.4 | 0.2 | — | — | 17/13 mins. |

*Effluent subsequently stirred in holding tank.
**Reactants not flowed through nozzle.

From Table I it may be observed that when the limestone slurry is flowed into the nozzle inlet at the stoichiometric ratio and at flow rates in excess of about 0.5 ft./sec. (0.61 ft./sec.—Run 1) the reaction went to completion in 24 hrs. in an unstirred holding tank. If the holding tank is also mechanically stirred, the reaction goes to completion in less than 15 minutes (Compare Runs 1 and 2 with Runs 6 and 7). On the other hand, when the limestone slurry is flowed through the nozzle at a velocity less than about 0.5 ft./sec. (0.20 ft./sec.—Run 3) the reaction is only 3.5% complete after 24 hrs. in an unstirred vessel.

When the limestone slurry is conflowed with the sodium bisulfite in a limestone rich ratio (0.2 M $NaHSO_3$: 0.4 M $CaCO_3$) above the noted settling velocity, the reaction goes to completion in 4 minutes in an unstirred holding tank (Run 4). This is to be contrasted to a like situation where the limestone slurry flow rate is substantially below the settling velocity and the reaction is only 2% complete after 5 minutes (Run 5).

In order to provide a basis of comparison with a batch mixing regime, the reactants were charged into a holding tank at the stoichiometric ratio, mechanically stirred, and periodically sampled and analyzed. The results are set forth in Table II.

| Sample No. | % Conversion | Time |
| --- | --- | --- |
| 1 | 22.4 | 15 mins. |
| 2 | 32.5 | 1 hr. |
| 3 | 52.1 | 2 hrs. |
| 4 | 65.4 | 3 hrs. |
| 5 | 77.8 | 4 hrs. |
| 6 | 87.2 | 5 hrs. |
| 7 | 100.0 | 24 hrs. |

*Stirred at 40 rpm with mechanical stirrer.

From the table it may be seen that the reaction proceeds at a relatively slow pace even in a stirred vessel, the reaction being only 22.4% complete after about 15 minutes as contrasted with the process where the reactants are initially flow-mixed and then admitted to a stirred vessel and the reaction goes to completion in less than 5 minutes (Run 4, Table I).

One way to provide adequate turbulence in the nozzle to achieve proper mixing is by maintaining the flow velocity of the sodium bisulfite at least about 75% of the flow velocity of the limestone slurry as was done in the disclosed example.

Figure 3A:
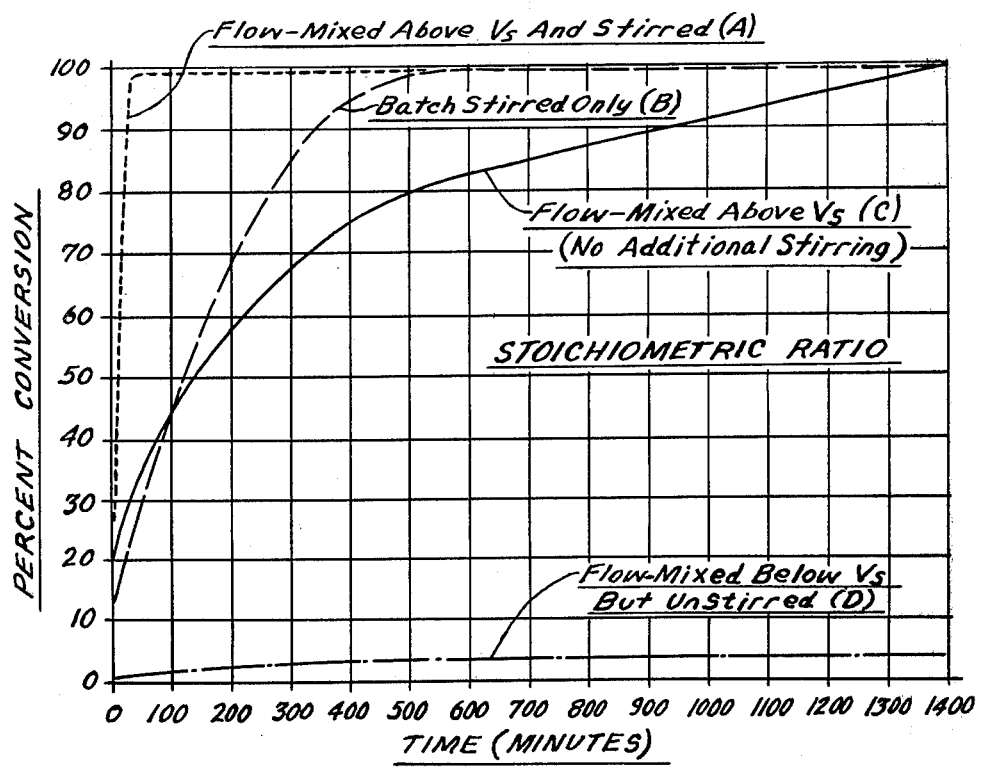
FIGS. 3a and 3b are graphs illustrating the relative efficacy of the present method.

Referring now to FIG. 3A, it may be seen that the optimum advantages of the present invention are realized when, at the stoichiometric ratio, the reactants are flow-mixed properly in the nozzle and subsequently stirred in a holding tank (Curve A). Less significant but still important advantages are realized simply by properly flow mixing the reactants, because mechanical stirrers are eliminated (Compare Curves B and C). Of course, Curve D demonstrates the lack of any advantage when the reactants are flowed through the nozzle improperly, i.e. below the limestone slurry settling velocity.

Figure 3B:
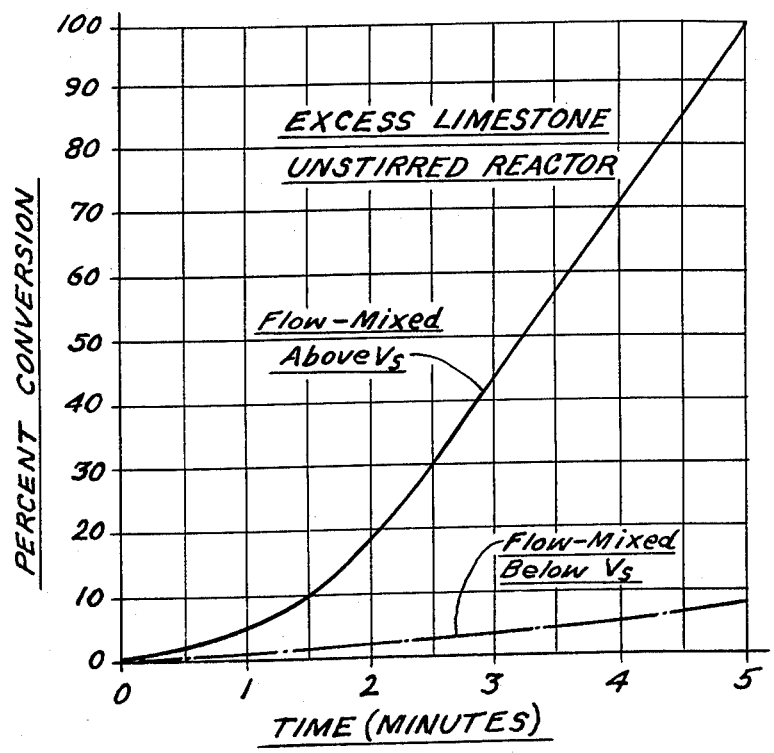

As best seen in FIG. 3B, when the process is run limestone rich, the maximum advantages of the present invention are realized, although at some increase in limestone usage.

In view of the foregoing, it should be apparent that the present invention now provides an improved method for regenerating sodium sulfite from sodium bisulfite in the Double Alkali flue gas desulfurization process. The method utilizes relatively low cost limestone as a reactant, and is, therefore, economical. Moreover, because the limestone-sodium bisulfite reaction is accelerated, the method eliminates the need for expensive and complicated reaction equipment with its concomitant capital outlays and maintenance costs.

While a preferred method has been described in detail, various modifications, alterations and changes may be made without departing from the spirit and scope of the present invention as defined in the appended claims.

We claim:

1. In a flue gas desulfurization process wherein sulfur dioxide is reacted in a scrubber with a sodium sulfite solution to form a sodium bisulfite solution, and wherein the sodium bisulfite solution is reacted with a limestone slurry to regenerate the sodium sulfite solution for recycling to the scrubber, said limestone slurry comprising limestone particles of a predetermined size and a water carrier with said particles tending to settle from said carrier at a predetermined velocity of the slurry, the improvement in the regenerating phase of the process comprising the steps of:

producing a stream of a limestone slurry flowing at a rate greater than said particle settling velocity, producing a stream of a sodium bisulfite solution flowing at a rate in predetermined mass relation with said limestone slurry stream, simultaneously conflowing said streams into a bifurcated mixing nozzle having a pair of inlets for said streams and a common outlet to initiate the reaction of the sodium bisulfite with the limestone in the effluent from the nozzle outlet, holding the effluent for a period of time sufficient to allow the reaction to go substantially to completion, and filtering the effluent before recycling to the scrubber.

2. The process according to claim 1 including the step of agitating the effluent during said holding step.

3. The process according to claim 2 wherein the molar ratio of limestone to sodium bisulfite is in a range of about 1:2 to about 2:1.

4. The process according to claim 3 wherein the concentration of limestone in said slurry is sufficient to provide limestone in excess of the stoichiometric ratio.

5. The process according to claim 1 wherein the concentration of limestone in said slurry relative to sodium bisulfite is sufficient to provide limestone in excess of the stoichiometric ratio.

6. The process according to claim 5 including the step of agitating the effluent during said holding step.

7. The process according to claim 1 including the step of maintaining the flow velocity of the sodium bisulfite into the nozzle at a rate of at least about 75% of the flow rate of the limestone slurry.

8. The process according to claim 1 wherein the limestone slurry flow rate is controlled so that at least about 50% of the limestone particles remain in suspension at the nozzle inlet.

9. The process according to claim 8 wherein the limestone slurry is flowed into said nozzle at a minimum rate of about 0.5 ft./sec.

10. The process according to claim 1 wherein said limestone slurry flow rate is controlled so that no substantial settling of limestone particles from the limestone slurry occurs at the inlet to the nozzle.

11. The process according to claim 10 wherein the concentration of limestone in said slurry relative to said sodium bisulfite provides limestone in excess of the stoichiometric ratio.

12. The process according to claim 11 including the step of agitating the effluent during said holding step.

13. The process according to claim 12 wherein said effluent is retained for less than about 15 minutes before being filtered.

14. The process according to claim 1 wherein the flow rate of the limestone slurry is related to the size of the limestone particles and the solids content thereof in the slurry and is controlled so as to exceed the velocity at which substantial particle settling occurs at the nozzle inlet.

* * * * *

UNITED STATES PATENT AND TRADEMARK OFFICE
CERTIFICATE OF CORRECTION

PATENT NO. : 4,261,962
DATED : April 14, 1981
INVENTOR(S) : Dauerman et al.

It is certified that error appears in the above-identified patent and that said Letters Patent are hereby corrected as shown below:

At Column 5, line 11 insert the following:

--TABLE II
Conversion of $CaCO_3$ to $CaSO_3$ as a Function of Time in a Stirred Holding Vessel at the Stoichiometric Ratio But Without Antecedent Nozzle Mixing* --

Signed and Sealed this

Twenty-first Day of July 1981

[SEAL]

Attest:

Attesting Officer

GERALD J. MOSSINGHOFF

Commissioner of Patents and Trademarks